E. N. GAILLARD.
POT SCRAPER.
APPLICATION FILED OCT. 22, 1917.
1,258,208.
Patented Mar. 5, 1918.
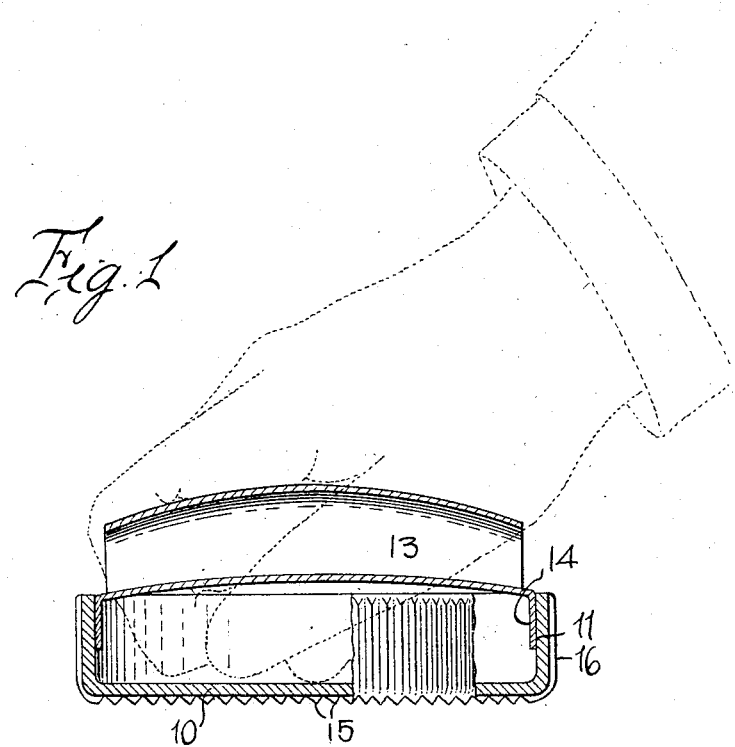
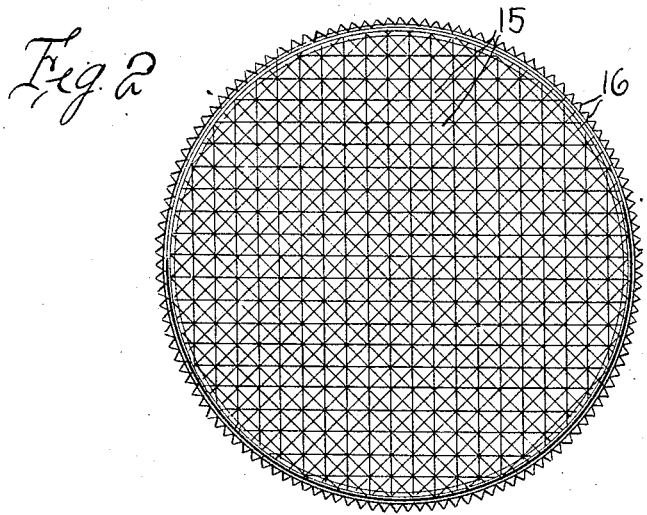
Inventor
E. N. Gaillard
By Watson E. Coleman
Attorney

UNITED STATES PATENT OFFICE.

ELLA NEILSON GAILLARD, OF NEW YORK, N. Y.

POT-SCRAPER.

1,258,208.  Specification of Letters Patent. Patented Mar. 5, 1918.

Application filed October 22, 1917. Serial No. 197,929.

*To all whom it may concern:*

Be it known that I, ELLA NEILSON GAILLARD, a citizen of the United States, residing at New York city, in the county of New York and State of New York, have invented certain new and useful Improvements in Pot-Scrapers, of which the following is a specification, reference being had to the accompanying drawings.

This invention relates to utensils for cleaning pots and pans, and particularly to a scraper for this purpose.

The general object of my invention is the provision of a very simple and effective pot scraper which may be used on practically pots of any form and which is so formed that it will scrape not only the bottom of the pot but the sides thereof.

A further object of my invention is to provide a scraper of this character which in practical use will protect the hand of the operator from any possible contamination, and a still further object is to provide a scraper so formed that it will act effectively upon the rounded or slightly concave surface of pot bottoms, and in this connection provide a scraper so formed that the scraper may be rotated as well as given a bodily rotary movement whereby to scrape dirt from the bottom of a pot.

Other objects will appear in the course of the following description.

My invention is illustrated in the accompanying drawings, wherein:

Figure 1 is a diametrical section of my improved pot scraper.

Fig. 2 is an under side plan view.

Referring to these figures, it will be seen that my scraper comprises a disk-like body 10 having an upstanding marginal flange 11, the body merging into this flange 11 by a slight curve 12. This body is made of relatively heavy and solid material, and preferably of metal, and is provided with a handle 13 which is formed tubular, the extremities of the tube being formed with downwardly bent lugs 14 which may be riveted, soldered, or otherwise attached to the upwardly extending flange 11.

The bottom of the scraper is serrated by V-shaped grooves extending at right angles to each other so as to provide a plurality of inverted pyramidal points 15, while the vertical side flanges of the body are formed with a plurality of V-shaped teeth 16 which at their lower ends merge into the serrated surface of the bottom.

In actual use the operator places her fingers around the handle, the fingers being fully protected by the upwardly extending side flanges 11, and then either rotates the scraper or gives a bodily rotary or circular movement to the scraper as a whole. The pyramidal points 15 act to cut, scrape, and disengage the dirt or other matter accumulated upon the bottom of the pot, while the rounded surface 12 has the same effect upon the rounded portion of the pot and the toothed side flanges 11 scrape the sides of the pot. Where the pan, pot or other utensil has flat sides, not rounded, it is obvious that the flat face of the scraper may be used against these flat sides and that if the device is given a bodily rotary movement within the pot the V-shaped teeth 16 will scrape the sides of the pot, a new scraping surface being presented to the sides of the pot as the scraper is bodily rotated.

My device may be very cheaply made, is extremely convenient, and is thoroughly effective in practice. Inasmuch as it is solid, considerable pressure may be placed upon it without any yielding of the cleaner or scraper. The handle being hollow, prevents the conduction of heat, so that the device may be used even in a hot pot.

Having described the invention, what I claim is:

1. A scraper of the character described comprising a disk-like body having an upwardly extending marginal flange and a handle extending across the body, the face of the body being toothed, the circumference of the side flange being formed with teeth extending at right angles to the under face of the disk.

2. A pot cleaner of the character described comprising a disk-like body having an upwardly extending marginal flange, the bottom face of the body merging into the outer face of the flange by a curved portion, the under face of the disk-like body being formed with pyramidal teeth, the side flange being formed with teeth extending at right angles to the under face, and a handle extending across the body and attached to the flanges thereof.

3. A pot cleaner of the character described comprising a disk-like body having an upwardly extending marginal flange, the bottom face of the body merging into the outer face of the flange by a curved portion, the under face of the disk-like body being formed with pyramidal teeth, the side flange being formed with teeth extending at right angles to the under face, and a handle extending across the body and attached to the flanges thereof, said handle being hollow.

In testimony whereof I hereunto affix my signature in the presence of two witnesses.

ELLA NEILSON GAILLARD.

Witnesses:
  CHARLES NEILSON,
  THOMAS T. CROTTY.

Copies of this patent may be obtained for five cents each, by addressing the "Commissioner of Patents, Washington, D. C."